(12) United States Patent
Bogue et al.

(10) Patent No.: US 12,045,116 B2
(45) Date of Patent: *Jul. 23, 2024

(54) SYSTEM FOR PROVIDING POWER TO LOW POWER SYSTEMS

(71) Applicant: Ambiq Micro, INc., Austin, TX (US)

(72) Inventors: Ivan Bogue, Austin, TX (US); Yousof Mortazavi, Austin, TX (US); Jesse Coulon, Austin, TX (US); Rajeev Srivastava, Austin, TX (US)

(73) Assignee: AMBIQ MICRO, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,907

(22) Filed: Jan. 6, 2023

(65) Prior Publication Data
US 2023/0400909 A1 Dec. 14, 2023

Related U.S. Application Data

(63) Continuation of application No. 17/835,217, filed on Jun. 8, 2022, now Pat. No. 11,573,624.

(51) Int. Cl.
*G06F 1/00* (2006.01)
*G06F 1/26* (2006.01)
*G06F 1/3296* (2019.01)

(52) U.S. Cl.
CPC ............ *G06F 1/3296* (2013.01); *G06F 1/263* (2013.01)

(58) Field of Classification Search
CPC .............................. G06F 1/3296; G06F 1/263
See application file for complete search history.

(56) References Cited

U.S. PATENT DOCUMENTS

| | | |
|---|---|---|
| 2008/0276105 A1 | 11/2008 | Hoberman |
| 2010/0052420 A1 | 3/2010 | Kang |
| 2014/0281630 A1 | 9/2014 | Chien |

*Primary Examiner* — Nitin C Patel
(74) *Attorney, Agent, or Firm* — NIXON PEABODY LLP

(57) ABSTRACT

A system comprises a microcontroller system comprising a CPU, an I/O module, and a microcontroller system power input, a power supply comprising a first power supply output providing power at a first power level, and a second power supply output providing power at a second power level, and a switch comprising a signal input communicatively coupled to the I/O module and configured to receive a status signal from the I/O module, a first switch power input electrically coupled to the first power supply output, a second switch power input electrically coupled to the second power supply output, and a switch power output electrically coupled to the microcontroller system power input and configured to output power to the microcontroller system.

20 Claims, 5 Drawing Sheets

SYSTEM FOR PROVIDING POWER TO LOW POWER SYSTEMS

CROSS REFERENCE TO RELATED APPLICATIONS

This application is a continuation of U.S. patent application Ser. No. 17/835,217, filed Jun. 8, 2022, now U.S. Pat. No. 11,573,264 issued Jan. 18, 2023, which is hereby incorporated by reference herein in its entirety.

TECHNICAL FIELD

The present disclosure relates generally to processing systems. More particularly, aspects of this disclosure relate to providing power to processing systems.

BACKGROUND

In recent years, due to the growth of portable electronics, there has been a push to decrease the power used by processing systems (e.g., microcontrollers ("MCUs"), microprocessors, application processors, digital signal processors ("DSPs"), neural processing units ("NPUs")) and other circuits used in portable electronic appliances. With lower power requirements, effective electronics operation time can be extended, or alternatively, smaller batteries can be used. Commonly, the power consumption of a microcontroller and associated circuits may be reduced by using a lower supply voltage, or by reducing the amount of internal capacitance being charged and discharged during the operation of the circuit.

One method for reducing microcontroller power relies on hardware or software-based power mode switching. Power modes can be selected for microcontroller components or resources based on operating state, operating conditions, and/or sleep cycle characteristics and other factors to configure low power modes for selected microcontroller components at the time the processor enters a low power or sleep state. In some systems, a set of predefined low power configurations can be used, while more sophisticated systems can dynamically select low power configurations to maximize power savings while still meeting system latency requirements.

However, even with available low power modes, microcontroller power usage can be adversely affected by interactions with connected sensors, memory systems, or other peripherals. Frequent interrupts or requests for service from such peripherals can greatly limit the time a microcontroller can remain in a low power mode. Systems that provide a reliable overall power management protocol and components for very low power operation are still needed.

BRIEF DESCRIPTION OF THE DRAWINGS

The disclosure will be better understood from the following description of exemplary embodiments together with reference to the accompanying drawings, in which.

Figure 1A:
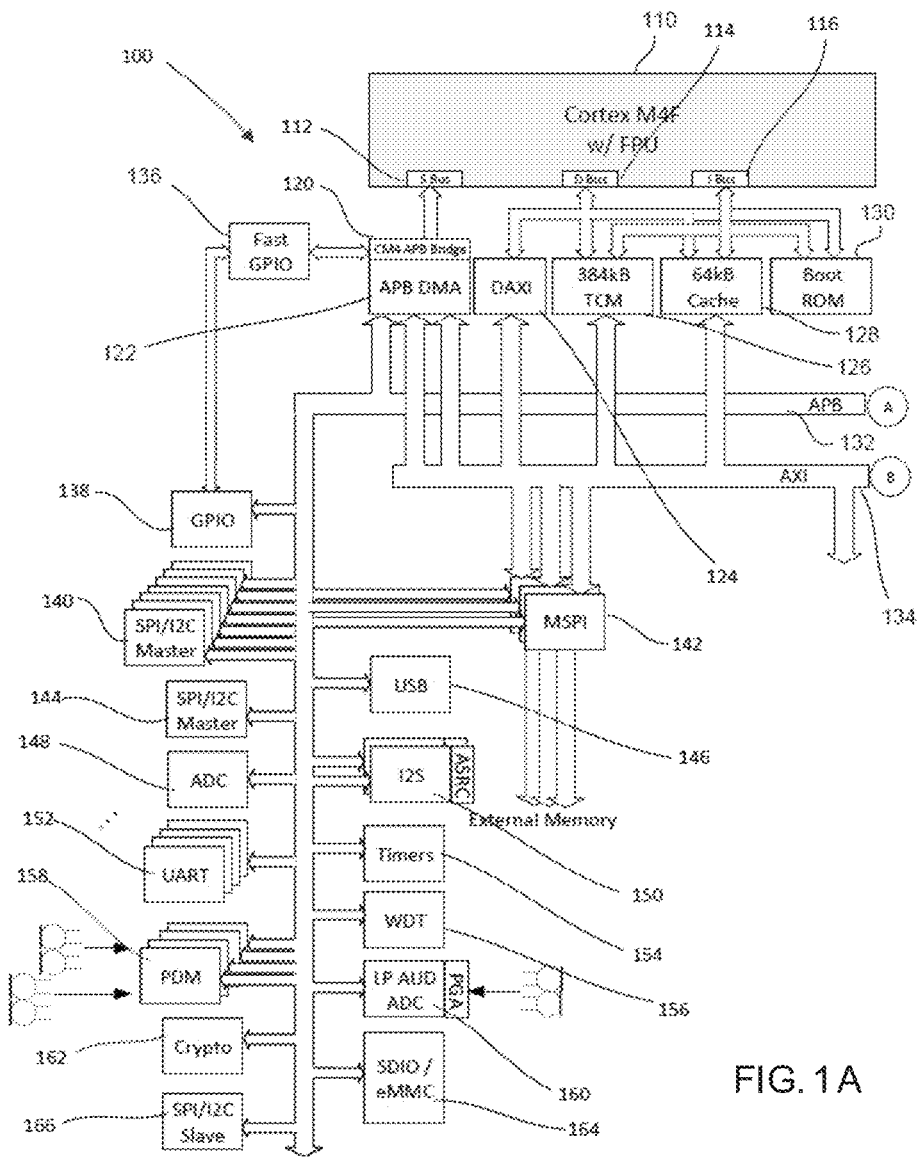
FIGS. 1A-1B depict a block diagram of an example microcontroller system, according to some embodiments.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a a system comprising a microcontroller system, the microcontroller system comprising and input/output (I/O) module and a microcontroller system power input, a power supply comprising a first power supply output, wherein the first power supply output provides power at a first power level and a second power supply output, wherein the second power supply output provides power at a second power level, and wherein the first power level is different than the second power level, an a switch comprising a signal input, wherein the signal input is communicatively coupled to the I/O module and configured to receive a status signal from the I/O module, a first switch power input electrically coupled to the first power supply output, a second switch power input electrically coupled to the second power supply output, and a switch power output electrically coupled to the microcontroller system power input and configured to output power to the microcontroller system from either the first power supply output or the second power supply output.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

As previously discussed, there has been a push to decrease the power used by processing systems (e.g., microcontrollers ("MCUs"), microprocessors, application processors, digital signal processors ("DSPs"), neural processing units ("NPUs"), graphics processing units ("GPUs")) and other circuits used in portable electronic devices. For ease of discussion, such processing systems will generally be referred to as "microcontroller systems" herein, though it should be appreciated that the disclosure provided herein can be applied to any suitable processing systems. One method for reducing power consumption relies on hardware and/or software based power mode switching. For example, when the device is in a sleep state or a functional sleep state (i.e., a low power mode), one or more components of the system are turned off or provided with a lower power level. While this can reduce the power consumption of the device, even in a sleep state, the device is still provided with the same power level as when it is in an active state. Accordingly, the device still draws significant power even when in a sleep state.

Described herein are systems, methods, and apparatuses that seek to reduce the power consumption of a device when the MCU is in a sleep state. As used herein, MCU will be used to refer generally to the analog and digital modules of a processing (or microcontroller) system. In one embodiment, a power source is provided that is configured to output power to the MCU at multiple levels. For example, the power supply can provide power at a first power level and a second power level, the first power level being greater than the second power level. The system includes a switch. The switch can operate to alternate the power supplied to the MCU between the first power level and the second power level. For example, when the MCU is in an active state, the switch can electrically couple the MCU to the power supply to receive the first power level, and when the MCU is in a sleep state, the switch can electrically couple the MCU to the power supply to receive the second (i.e., lower) power level, thus resulting in power savings when the MCU is in the sleep state. The discussion of FIGS. 1 and 2 provide an overview of a MCU system that can be used with the power supply described herein.

Figure 1B:
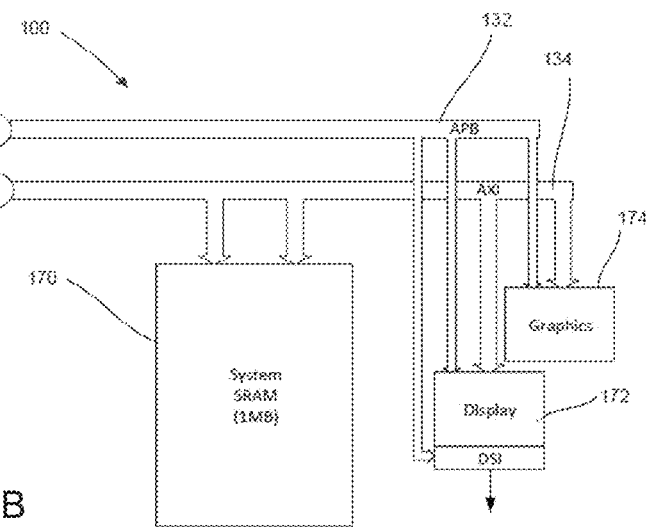
Figure 2:
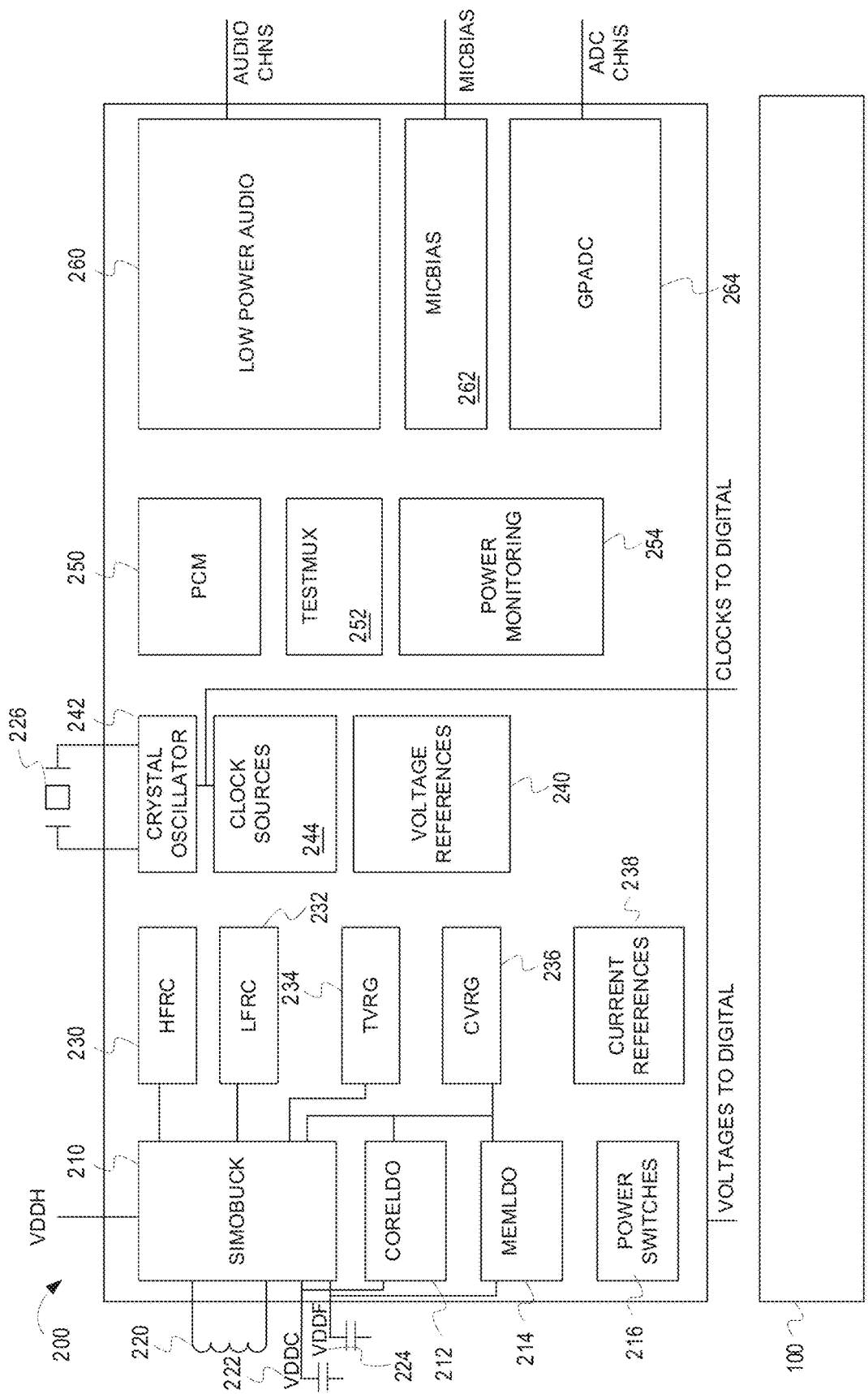
FIG. 2 is a block diagram of an example analog module that supplies power, external signals, and clock signals to the microcontroller system in FIG. 1, according to some embodiments.

FIGS. 1A-1B depict a block diagram of an example low power microcontroller system 100 of an overall MCU. The example low power microcontroller system 100 includes a central processing unit (CPU) 110. The CPU 110 in this example is Cortex M4F (CM4) with a floating point unit. The CPU 110 includes a System-bus interface 112, a Data-bus interface 114, and an Instruction-bus interface 116. It is to be understood, that other types of general CPUs, or other processors such as DSPs or NPUs may incorporate the principles described herein.

The System-bus interface 112 is coupled to a Cortex CM4 advanced peripheral bus (APB) bridge 120 that is coupled to an advanced peripheral bus (APB) direct memory access (DMA) module 122. The microcontroller system 100 includes a Data Advanced eXtensible Interface (DAXI) 124, a tightly coupled memory (TCM) 126, a cache 128, and a boot ROM 130. The Data-bus interface 114 allows access to the DAXI 124, the TCM 126, the cache 128, and the boot read only memory (ROM) 130. The Instruction-bus interface 116 allows access to the TCM 126, the cache 128, and the boot ROM 130. In this example, the DAXI interface 124 provides write buffering and caching functionality for the microcontroller system 100. The DAXI interface 124 improves performance when accessing peripherals like the SRAM and the MSPIs.

An APB (Advanced Peripheral Bus) 132 and an Advanced eXtensible Interface (AXI) bus 134 are provided for communication between components on the microcontroller system 100. The APB 132 is a low speed and low overhead interface that is used for communicating with peripherals and registers that don't require high performance and don't change often (e.g., when a controller wants to set configuration bits for a serial interface). The AXI bus 134 is an ARM standard bus protocol that allows high speed communications between multiple masters and multiple busses. This is useful for peripherals that exchange large amounts of data (e.g., a controller that talks to an ADC and needs to transfer ADC readings to a microcontroller or a GPU that talks to a memory and needs to transfer a large amount of graphics data to/from memories).

A fast general purpose input/output (GPIO) module 136 is coupled to the APB bridge 120. A GPIO module 138 is coupled to the fast GPIO module 136. The APB bus 132 is coupled to the GPIO module 138. The APB bus 132 is coupled to a series of Serial Peripheral Interface/Inter-Integrated Circuit (SPI/I2C) interfaces 140 and a series of Multi-bit Serial Peripheral Interfaces (MSPI)s 142. The MSPIs 142 are also coupled to the AXI bus 134 and provide access to external memory devices.

The APB bus 132 also is coupled to a SPI/I2C interface 144, a universal serial bus (USB) interface 146, an analog to digital converter (ADC) 148, an Integrated Inter-IC Sound Bus (I2S) interface 150, a set of Universal Asynchronous Receiver/Transmitters (UART)s 152, a timers module 154, a watch dog timer circuit 156, a series of pulse density modulation (PDM) interfaces 158, a low power audio ADC 160, a cryptography module 162, a Secure Digital Input Output/Embedded Multi-Media Card (SDIO/eMMC) interface 164, and a SPI/I2C slave interface module 166. The PDM interfaces 158 may be connected to external digital microphones. The low power audio ADC 160 may be connected to an external analog microphone through internal programmable gain amplifiers (PGA).

A system static random access memory (SRAM) 170, which is 1 MB in this example, is accessible through the AXI bus 134. The microcontroller system 100 includes a display interface 172 and a graphics interface 174 that are coupled to the APB bus 132 and the AXI bus 134.

Components of the disclosed microcontroller system 100 are further described by U.S. Provisional Ser. No. 62/557, 534, titled "Very Low Power Microcontroller System," filed Sep. 12, 2017; U.S. application Ser. No. 15/933,153, filed Mar. 22, 2018 titled "Very Low Power Microcontroller System," (Now U.S. Pat. No. 10,754,414), U.S. Provisional Ser. No. 62/066,218, titled "Method and Apparatus for Use in Low Power Integrated Circuit," filed Oct. 20, 2014; U.S. application Ser. No. 14/855,195, titled "Peripheral Clock Management," (Now U.S. Pat. No. 9,703,313), filed Sep. 15, 2015; U.S. application Ser. No. 15/516,883, titled "Adaptive Voltage Converter," (Now U.S. Pat. No. 10,338,632), filed Sep. 15, 2015; U.S. application Ser. No. 14/918,406, titled "Low Power Asynchronous Counters in a Synchronous System," (Now U.S. Pat. No. 9,772,648), filed Oct. 20, 2015; U.S. application Ser. No. 14/918,397, titled "Low Power Autonomous Peripheral Management," (Now U.S. Pat. No. 9,880,583), filed Oct. 20, 2015; U.S. application Ser. No. 14/879,863, titled "Low Power Automatic Calibration Method for High Frequency Oscillators," (Now U.S. Pat. No. 9,939,839), filed Oct. 9, 2015; U.S. application Ser. No. 14/918,437, titled "Method and Apparatus for Monitoring Energy Consumption," (Now U.S. Pat. No. 10,578,656), filed Oct. 20, 2015; U.S. application Ser. No. 17/081,378, titled "Improved Voice Activity Detection Using Zero Crossing Detection," filed Oct. 27, 2020, U.S. application Ser. No. 17/081,640, titled "Low Complexity Voice Activity Detection Algorithm," filed Oct. 27, 2020, all of which are hereby incorporated by reference.

While the discussion of FIG. 1A-1B describes a microcontroller system 100, the discussion of FIG. 2 describes an analog module 200 that supplies power, external signals, and clock signals to the microcontroller system 100. In one embodiment, both the digital module (i.e., the microcontroller system 100 of FIGS. 1A and 1B) and the analog module 200 of FIG. 2 are on board an MCU that is fabricated on a chip.

FIG. 2 depicts a block diagram of an analog module 200 that interfaces external components with the microcontroller system 100 in FIGS. 1A and 1B. The analog module 200 supplies power to different components of the microprocessor system 100 as well as providing clocking signals to the microcontroller system 100. The analog module 200 includes a Single Inductor Multiple Output (SIMO) buck converter 210, a core low drop-out (LDO) voltage regulator 212, and a memory LDO voltage regulator 214. The LDO voltage regulator 212 supplies power to processor cores of the microcontroller system 100, while the memory LDO voltage regulator 214 supplies power to volatile memory devices of the microcontroller system 100 such as the SRAM 170. A switch module 216 represents switches that allow connection of power to the different components of the microcontroller system 100.

The SIMO buck converter module 210 is coupled to an external inductor 220. The module 200 is coupled to a Voltage dipolar direct core (VDDC) capacitor 222 and a voltage dipolar direct flash (VDDF) capacitor 224. The VDDC capacitor 222 smooths the voltage output of the core LDO voltage regulator 212 and the SIMO buck converter 210. The VDDF capacitor 224 smooths the voltage output of the memory LDO voltage regulator 214 and the SIMO buck converter 210. The module 200 is also coupled to an external crystal 226.

The SIMO buck converter 210 is coupled to a high frequency reference circuit (HFRC) 230, a low frequency reference circuit (LFRC) 232, and a temperature voltage regulator (TVRG) circuit 234. The HFRC 230 and the LFRC 232 are clock supplies that can be used, for example, to trigger a comparator to determine if the SIMO buck converter 210 needs to replenish a rail. A calibrated voltage regulator (CVRG) circuit 236 is coupled to the SIMO buck converter 210, the core LDO voltage regulator 212, and the memory LDO voltage regulator 214. Thus, temperature compensation is performed on the voltage sources. A set of current reference circuits 238 is provided as well as a set of voltage reference circuits 240.

In this example, the LDO voltage regulators 212 and 214 are used to power up the microcontroller system 100. The more efficient SIMO buck converter 210 is used to power different components on demand.

A crystal oscillator circuit 242 is coupled to the external crystal 226. The crystal oscillator circuit 242 provides a drive signal to a set of clock sources 244. The clock sources 244 include multiple clocks providing different frequency signals to the components on the microcontroller system 100.

The analog module 200 also includes a process control monitoring (PCM) module 250 and a test multiplexer 252. Both the PCM module 250 and the test multiplexer 252 allow testing and trimming of the microcontroller system 100 prior to shipment. The PCM module 250 includes test structure that allow programming of the compensation voltage regulator 236. The test multiplexer 252 allows trimming of different components on the microcontroller system 100. The analog module 200 includes a power monitoring module 254 that allows power levels to different components on the microcontroller system 100 to be monitored. The power monitoring module 254 in this example includes multiple state machines that determine when power is required by different components of the microprocessor system 100. The power monitoring module 254 works in conjunction with the power switch module 216 to supply appropriate power when needed to the components of the microprocessor system 100. The analog module 200 includes a low power audio module 260 for audio channels, a microphone bias module 262 for biasing external microphones, and a general purpose analog to digital converter 264.

The SIMO buck converter 210 (shown in FIG. 2) supplies DC voltage at different levels to components and devices of the microcontroller system 100 in FIG. 1 and the analog module 200 in FIG. 2. As explained above, the SIMO buck converter 210 is coupled via the power switch module 216 to provide power and thus enable different components and devices on the microcontroller system 100 and the analog module 200. The SIMO buck converter 210 serves as an efficient power supply for the components and devices on the microcontroller system 100 and the analog module 200.

Figure 3:
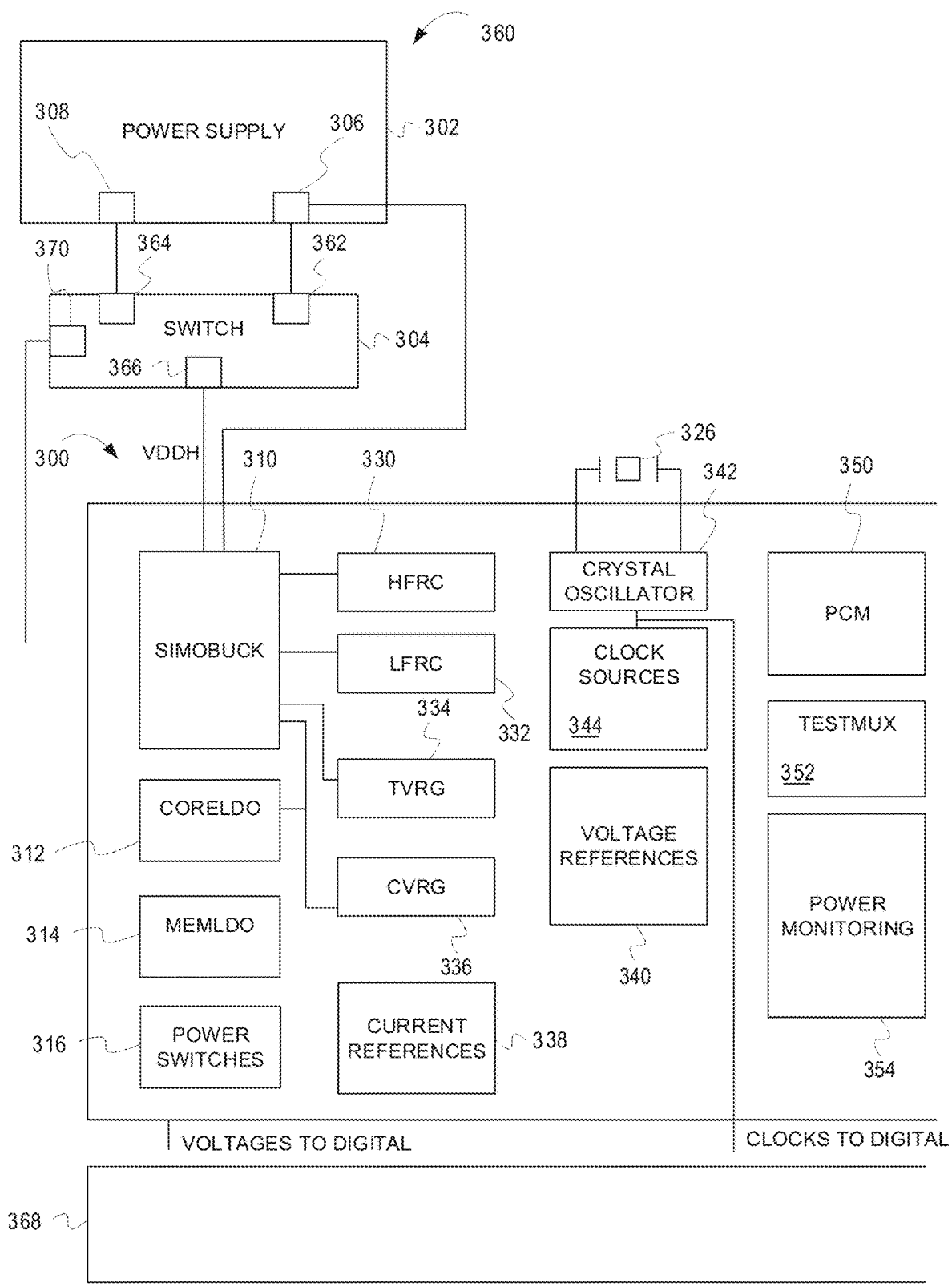
FIG. 3 is a block diagram of a power source including a switch that is electrically coupled to a microcontroller system, according to some embodiments.
Figure 4:
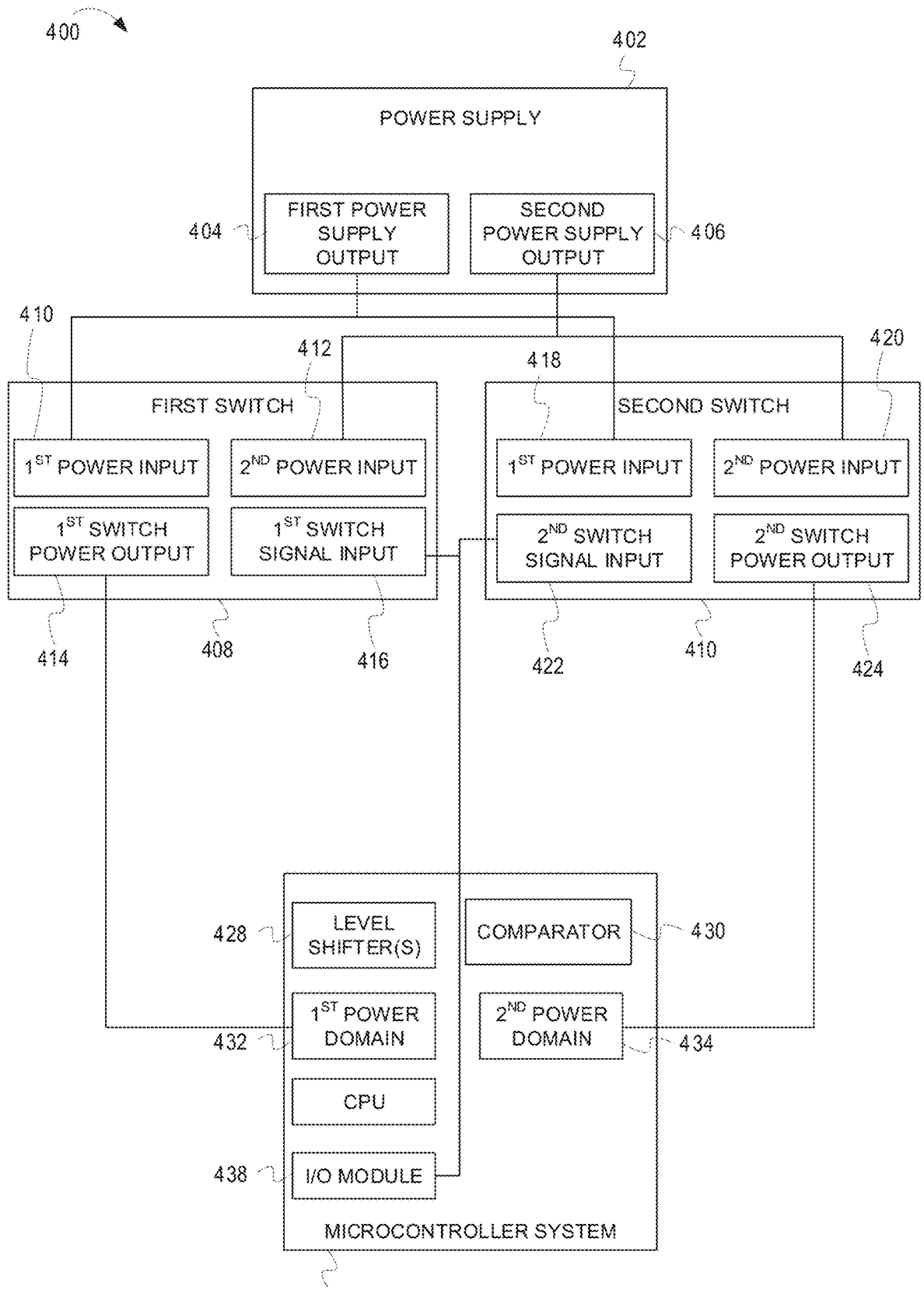
FIG. 4 is a block diagram of a system including a power supply including two switches that are electrically coupled to a microcontroller system, according to some embodiments.
Figure 5:
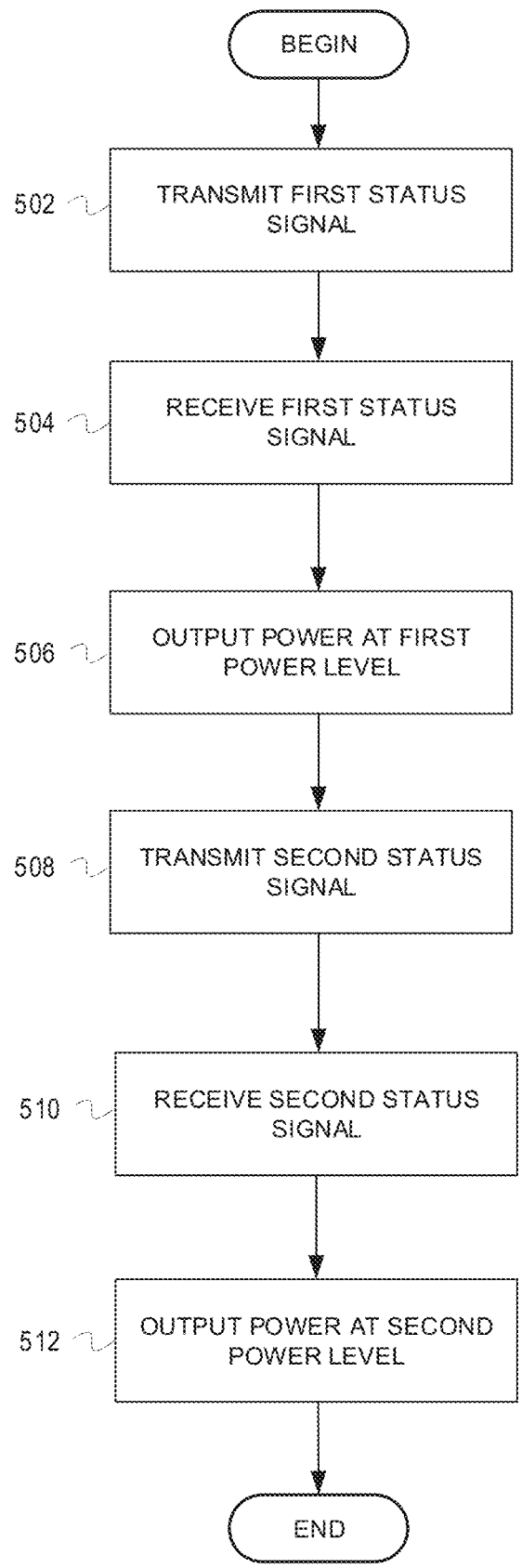
FIG. 5 is a flowchart depicting example operations for selectively outputting power to a microcontroller system, according to some embodiments.

While the discussion of FIG. 1A, FIG. 1B, and FIG. 2 provides detail regarding a microcontroller system and an analog module, the discussion of FIGS. 3-5 describes a power source configured to supply power to the microcontroller system and/or analog module.

FIG. 3 is a block diagram of a power source 360 including a switch 304 that is electrically coupled to a microcontroller system 368, according to some embodiments. As depicted in FIG. 3, the power source 360 is electrically coupled to an analog module 300 and the analog module 300 is electrically coupled to the microcontroller system 368. The analog module 300 can be the same as, or different than, the analog module 200 depicted in FIG. 2. For ease of discussion, it is assumed that the analog module 300 is the same as the analog module 200 of FIG. 2. FIG. 3 depicts only a portion of the analog module 300. Specifically, FIG. 3 depicts the SIMO buck 310, Core LDO 312, a memory LDO 314, power switches 316, HFRC 330, LFRC 332, TVRG 334, current references 338, external crystal 326, crystal oscillator 342, clock sources 344, voltage references 340, PCM 350, Test Mux 352, and power monitoring 354. Additionally, the microcontroller system 368 can be the same as, or different than, the microcontroller system depicted in FIGS. 1A and 1B. It should be noted that, in some embodiments, the microcontroller system 368 and analog module 300 can be a system-on-chip and the power source 360 can be located off of the system-on-chip.

The power source 360 includes a power supply 302 and a switch 304. Though the power source 360 is referred to as including the power supply 302 and the switch 304, the power supply 360 need not be a single component (i.e., the power supply 302 and the switch 304 may be physically separate components). In one embodiment, the power supply 302 is a dual mode power supply. That is, the power supply 302 is configured to provide power at two (or more) power levels. The two (or more) power levels can be different from other ones of the power levels. As a simple example, the power supply 302 can supply power at first power level (e.g., 1.8V) and a second power level (e.g., 1.2V). It should be noted that the power supply 302 can supply power at more than two levels and at any desired power levels. In the example shown in FIG. 3, the power supply 302 includes a first power supply output 306 and a second power supply output 308. Continuing this example, the first power supply output 306 provides power at 1.8V (i.e., the first power level) and the second power supply output 308 provides power at 1.2V (i.e., the second power level).

The switch 304 is configured to selectively supply power to the microcontroller system 368 at different power levels from the power source 360. Accordingly, the switch 304 can be of any suitable type. For example, the switch 304 can be a mechanical switch or an electronic switch. In some embodiments, the switch 304 may not be a physical switch. For example, the switch 304 can be executed programmatically within the power supply 302. In such embodiments, a voltage level of an internal reference can be altered or the feedback ratio of a voltage divider can be used to provide the varying power output levels.

The switch 304 is electrically coupled to the first power supply output 306 via a first switch power input 362 and the second power supply output 308 via a second power supply input 364. The switch 304 is electrically coupled to the analog module 300 via a switch power output 366. For example, the switch 304 can be electrically coupled to the SIMO buck 310 of the analog module 300. The switch 304 selectively outputs power to the microcontroller system 368 via the switch power output 366. That is, the switch 304 can provide power to the microcontroller system 368 at the first power level and/or the second power level. In one embodiment, the output of the switch 304 is dependent upon a state of the microcontroller system 368. For example, when the microcontroller system 368 is an active state, the switch 304 can output power to the microcontroller system at the first power level. Similarly, when the microcontroller is not in an active state (e.g., a sleep state), the switch 304 can output power to the microcontroller system 368 at the second power level.

In embodiments in which the power level supplied by the switch 304 is based on a state of the microcontroller system 368, the switch 304 includes a signal input 370. The signal input 370 can be electrically coupled to any suitable component(s) of the microcontroller system 368 and/or the analog module 300. As one example, the signal input 370 can be communicatively coupled to an I/O module (e.g., a GPIO module) of the microcontroller system depicted in FIG. 1A. The switch 304 receives status signals via the switch input 370. The switch 304 selectively outputs power via the switch power output 366 based on the status signals. For example, if the I/O module outputs a status signal indicating that the microcontroller system 368 is in a sleep state, the switch 304 outputs power to the microcontroller system 368 via the switch power output 366 at the second power level.

In some embodiments, portions of the microcontroller system 368 and/or analog module 300 may not switch between the first power level and the second power level. For example, an ADC, the HFRC, radios (e.g., a near field communication (NFC) radio), etc. may always receive power at the first power level. In such embodiments, as shown in FIG. 3, the first power supply 306 may be coupled to the analog module 300 (e.g., via the SIMO buck 310) without passing through the switch 304. In such embodiments, a first portion of the microcontroller system 368 and/or analog module 300 may selectively alternate between the first power level and the second power level, while a second portion of the microcontroller system 368 and/or analog module 300 may always receive power at the first power level. Similarly, one or more of the components of the microcontroller system 368 and/or analog module 300 may always be at the second power level.

While the discussion of FIG. 3 provides background information regarding a power source including a switch, the discussion of FIG. 4 provides additional detail regarding such a system.

FIG. 4 is a block diagram of system 400 including a power supply 402 including two switches that are electrically coupled to a microcontroller system 442, according to some embodiments. The system 400 includes the power supply 402, a first switch 408, a second switch 410, and the microcontroller system 442. In some embodiments, the microcontroller system 426 includes an analog module. The microcontroller system 442 includes two power domains: 1) a first power domain 432; and 2) a second power domain 434. Each of the power domains (i.e., the first power domain 432 and second power domain 434) can include any desired components of the microcontroller system 442. For example, the first power domain 432 may include analog components and the second power domain 434 may include radiofrequency components. In some embodiments, the power level can be increased for each of the first power domain 432 and the second power domain 434 independently. In such embodiments, states between the sleep state and active state can be achieved. For example, an "intermediate" state can be achieved when one of the first power domain 432 and the second power domain 434 is at the first power level and the other of the first power domain 432 and the second power domain 434 is at the second power level. Although depicted in FIG. 4 (and FIG. 3) as only a single power supply that is capable of providing power at multiple levels, in some embodiments, the power supply 402 can include multiple individual power supplies.

The power supply 402 includes two power supply outputs: 1) a first power supply output 404; and 2) a second power supply output 406. The first power supply output 404 is configured to supply power at a first power level and the second power supply output 406 is configured to supply power at a second power level. In some embodiments, the first power level and the second power level are different power levels. For example, the first power level can be a high power level (e.g., 1.8 volts) and the second power level can be a low power level (e.g., 1.2 volts).

The first switch 408 is electrically coupled to the power supply 402. The first switch 408 is electrically coupled to the power supply 402 via a first power input 410 and a second power input 412. The first power input 410 is electrically coupled to the power supply 402 via the first power supply output 404 and the second power input 412 is electrically coupled to the power supply 402 via the second power supply output 406. Accordingly, the first switch 408 receives power from the power supply 402 at the first power level and the second power level. The first switch 408 includes a first switch power output 414. The first switch power output 414 is electrically coupled to the microcontroller system 442. The first switch 408 includes a first switch signal input 416. The first switch signal input 416 is communicatively coupled to the microcontroller system 442. The first switch 408 selectively alternates power supplied to the microcontroller system 442 via the first switch power output 414 based on status signals received from the microcontroller system 442 via the first switch signal input 416.

The second switch 410 is electrically coupled to the power supply 402. The second switch 410 is electrically coupled to the power supply 402 via a first power input 418 and a second power input 420. The first power input 418 is electrically coupled to the power supply 402 via the first power supply output 404 and the second power input 420 is electrically coupled to the power supply 402 via the second power supply output 406. Accordingly, the second switch 410 receives power from the power supply 402 at the first power level and the second power level. The second switch 410 includes a second switch power output 424. The second switch power output 424 is electrically coupled to the microcontroller system 442. The second switch 410 includes a second switch signal input 422. The second switch signal input 422 is communicatively coupled to the microcontroller system 442. The second switch 410 selectively alternates power supplied to the microcontroller system 442 via the first switch power output 414 based on status signals received from the microcontroller system 442 via the second switch signal input 424.

As previously discussed, the microcontroller system 442 includes the first power domain 432 and the second power domain 434. The power domains are electrically coupled to different switches such that the power level to each of the power domains can be independently controlled. For example, as depicted in FIG. 4, the first power domain 432 is electrically coupled to the first switch 408 (via the first switch power output 414) and the second power domain 434 is electrically coupled to the second switch 410 (via the second switch power output 424). Accordingly, the power level supplied to each of the power domains can be independently controlled. For example, the first power domain 432 can receive power at the first power level via the first switch 408 while the second power domain 434 receives power at the second power level from the second switch 410 simultaneously. Such a system can be advantageous for a number of reasons. First, because the power level to each power domain is independently controllable, if only a portion of the microcontroller system 442 requires a higher power level (i.e., the first power level), the entirety of the microcontroller system 442 need not be provided with the higher power level. This can result in a lowered overall power consumption of the system 400. As another example, such systems allow the power to the microcontroller 442 to be increased from the second level to the first power level in a more controlled fashion. For example, power can be increased on a domain-by-domain basis. In such embodiments, when the microcontroller system 400 is moving from a sleep state to an active state, the power supplied to the first power domain 432 can be increased followed by an increase in the power supplied to the second power domain 434. This can be achieved by transmitting sequential signals from an I/O module 438 of the microcontroller system 442 to the first switch 408 and then the second switch 410 (or vice versa). Such a sequential ramp-up of power on a domain-by-domain basis can lessen any possible impacts on any other components operating within the system 400 (e.g., a second chip, peripherals, etc.). In some embodiments, the power level of the microcontroller system 442 can be increased and/or decreased in steps to lessen the impact of moving from one power level to the other. That is, when moving from the second power level to first power level when transitioning to an active state, the voltage can be increased incrementally from the second power level to the first power level. For example, if the second power level is 1.2V and the first power level is 1.8V, power can be increased for the microcontroller system from 1.2V to 1.4V, from 1.4V to 1.6V, and from 1.6V to 1.8V. While the values of 1.2V and 1.8V and the increments of 0.2V are provided as examples, it is understood than any suitable power levels and increments can be used.

In some embodiments, the microcontroller system 442 also includes level shifters 428. The level shifters 428 are communicatively coupled to the first power domain 432 and the second power domain 434 and can be located in one, or both, of the first power domain 432 and the second power domain 434. The level shifters 428 allow communication between the first power domain 432 and the second power domain 434 when the first power domain 432 and the second power domain 434 are at different power levels. For example, if the first power domain 432 is at the first power level and the second power domain 434 is at the second power level, the level shifters 428 can translate signals from the first power domain to the second power domain from the first power level to the second power level. Likewise, the level shifters 428 can translate signals from the second power domain 434 to the first power domain 432 from the second power level to the first power level.

In some embodiments, the microcontroller system 442 can also include logic to ensure that the microcontroller system 442 is at the proper voltage for its desired operations. For example, when the microcontroller system 442 is at the second power level and increasing to the second power level, the logic can hold performance of some, or all, of the operations of the microcontroller system 442 until the voltage in the microcontroller system 442 reaches the first power level (or any desired threshold level). A simple example of such a mechanism is a timer. In this example, when the I/O module 438 of the microcontroller system transmits a status signal to one or both of the first switch 408 and the second switch 410, the timer can activate. The timer can be set for any desired time and logic can be implemented that hold performance of some, or all, of the operations of the microcontroller unit 442 until the timer expires. For example, the one or more circuits of the microcontroller system 442 can be power gated until the timer expires. As another example, and as depicted in the example provided in FIG. 4, the microcontroller system 442 can include a set of comparators 430. In this example, the comparators 430 monitor power levels within the microcontroller system 442 (e.g., overall, in the first power domain 432, and/or in the second power domain 434). Additionally, in some embodiments, the microcontroller system 442 can include multiple comparators, each monitoring the power level of a different part of the microcontroller system 442 (e.g., a first comparator monitoring power levels in the first power domain 432, a second comparator monitoring power levels in the second power domain 434, a third comparator monitoring an overall power level of the microcontroller system 442, etc.).

The comparators 430 monitor the power level of the microcontroller system 442 with respect to a reference voltage. In one embodiment, each comparator 430 has one input coupled to the power source being supplied and the other input coupled to a reference voltage source. Thus, the comparators 430 output a signal when the voltage level of the power source exceeds the value of the reference voltage. Logic adapted with the outputs of the comparators can hold some, or all, of the operations of the microcontroller system until the reference voltage is achieved for the microcontroller system 442 (or a portion of the microcontroller system 442). As previously discussed, such logic can include power gates that power gate one or more circuits of the microcontroller system 442.

While the discussion of FIGS. 3 and 4 provide additional detail regarding a system including a switch to selectively alternate the power level supplied to a microcontroller system, the discussion of FIG. 5 provides additional detail regarding the operation of such a system.

FIG. 5 is a flowchart depicting example operations for selectively outputting power to a microcontroller system, according to some embodiments. The flow begins at block 502.

At block 502, a first status signal is transmitted. For example, an I/O module of a microcontroller system can transmit the first status signal. The first status signal is indicative of a first state of the microcontroller system. The state can be, for example, an active state, a sleep state, a functional sleep state, an intermediate state, etc. The flow continues at block 504.

At block 504, the first status signal is received. For example, a switch can receive the first status signal from the I/O module of the microcontroller system. The switch is communicatively coupled to the I/O module of the microcontroller system. The switch is electrically coupled to two or more power supplies, or power supply outputs. Each of the power supplies, or power supply outputs, provides power at a different power level. For example, the power levels can be a high power level and a low power level. The flow continues at block 506.

At block 506, power is output at the first power level. For example, in response to receipt of the first status signal, the switch can output power to the microcontroller system at the first power level. The switch outputs the power to the microcontroller system via a switch power output. The flow continues at block 508.

At block 508, a second status signal is transmitted. For example, the I/O module of the microcontroller system can transmit the second status signal. The second status signal is indicative of a second state of the microcontroller system. For example, if the first state of the microcontroller system is an active state, the second state of the microcontroller system can be a sleep state. The flow continues at block 510.

At block 510, the second status signal is received. For example, the switch can receive the second status signal from the I/O module of the microcontroller system. The flow continues at block 512.

At block 512, power is output at the second power level. For example, in response to receipt of the second status signal, the switch can output power to the microcontroller system at the second power level. Continuing the example above, if the second state of the microcontroller system is a sleep state, the switch can output power to the microcontroller system at the low power level. It should be noted that in use, the system will move back and forth between the first power level and the second power level as power requirements change. Accordingly, after the switch outputs power to the microcontroller system and the second power level, the I/Om module can transmit subsequent status signals to cause the switch to output power to the microcontroller system at the first power level.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system comprising:
   a processing system, the processing system comprising:
      an input/output (I/O) module; and
      a processing system power input;
   a power supply, the power supply comprising:
      a first power supply output, wherein the first power supply output provides power at a first power level; and
      a second power supply output, wherein the second power supply output provides power at a second power level, and wherein the first power level is different than the second power level; and
   a switch, the switch comprising:
      a signal input, wherein the signal input is communicatively coupled to the I/O module and configured to receive a status signal from the I/O module;
      a first switch power input electrically coupled to the first power supply output;

a second switch power input electrically coupled to the second power supply output; and a switch power output electrically coupled to the processing system power input and configured to output power to the processing system from either the first power supply output or the second power supply output.

2. The system of claim 1, wherein the switch alternates the output power to the processing system based on the status signal.

3. The system of claim 1, wherein:
the processing system further comprises a second processing system power input, wherein the second processing system power input is electrically coupled to a second power domain of the processing system and wherein the processing system power input is electrically coupled to a first power domain of the processing system; and
a second switch, wherein the second switch is electrically coupled to the first power supply output, the second power supply output, and the I/O module.

4. The system of claim 3, wherein the I/O module is configured to sequentially transmit a first status signal to the first switch and a second status signal to the second switch to sequentially alter the output power to first power domain and the second power domain.

5. The system of claim 1, wherein the processing system further comprises:
a comparator configured to compare the output of the switch power output to a reference voltage.

6. The system of claim 1, wherein the processing system includes a first power domain and a second power domain, wherein the processing system power input is electrically coupled to the first power domain, the processing system further comprising:
a second processing system power input, wherein the second processing system input is electrically coupled to the second power domain and one of the first power output and the second power output.

7. The system of claim 6, further comprising:
a level shifter electrically coupled to the first power domain and the second power domain.

8. The system of claim 1, wherein the status signal is based on a state of the processing system.

9. The system of claim 8, wherein the state of the processing system is one or more of a sleep state, a functional sleep state, and an active state.

10. The system of claim 1, wherein the processing system is a system on a chip and the switch is located external to the system on a chip.

11. The system of claim 1, wherein only portions of the processing system alternate between the first power level and the second power level.

12. An external power source for a processing system, the external power source comprising:
a power supply, the power supply comprising;
a first power supply output configured to provide power at a first power level;
a second power supply output configured to provide power at a second power level, wherein the second power level is different than the first power level; and
a switch, the switch comprising:
a signal input configured to be communicatively coupled to the processing system;
a first switch power input electrically coupled to the first power supply output;
a second switch power input electrically coupled to the second power supply output; and
a switch power output configured to be electrically coupled to a processing system power input of the processing system and configured to output power to the processing system from either the first power supply output or the second power supply output.

13. The external power source of claim 12, wherein the signal input is configured to receive a status signal from the processing system, and wherein the switch alternates the power output to the processing system between the first power level and the second power level based on the status signal.

14. The external power source of claim 12, further comprising:
a secondary switch, the secondary switch comprising:
a second signal input configured to be communicatively coupled to the processing system;
a secondary first switch power input electrically coupled to the first power supply output;
a secondary second switch power input electrically coupled to the second power supply output; and
a secondary second switch power output configured to be electrically coupled to a second processing system power input of the processing system, wherein the second processing system power input is associated with a different power domain of the processing system than the processing system power input, and wherein the secondary second switch power output is configured to output power to the processing system.

15. A method for selectively outputting power to a processing system, the method comprising:
transmitting, by an input/output (I/O) module of the processing system to a signal input of a switch, a first status signal, wherein the first status signal is indicative of a first state of the processing system;
receiving, by the signal input of the switch, the first status signal;
outputting, by the switch in response to receipt of the first status signal, power to the processing system via a processing system power input of the processing system at a first power level;
transmitting, by the I/O module of the processing system to the signal input of the switch, a second status signal, wherein the second signal is indicative of a second state of the processing system;
receiving, by the signal input of the switch, the second status signal;
outputting, by the switch in response to receipt of the second status signal, power to the processing system via the processing system power input of the processing system at a second power level, wherein the second power level is different than the first power level.

16. The method of claim 15, wherein the processing system power input of the processing system is associated with a first power domain, the method further comprising:
transmitting, by the I/O module of the processing system to a signal input of a second switch, the first status signal;
receiving, by the signal input of the second switch, the first status signal;
outputting, by the second switch in response to receipt of the first status signal, power to the processing system via a second processing system power input of the processing system at the first power level, wherein the second processing system power input of the processing system is associated with a second power domain of the processing system;

transmitting, by the I/O module of the processing system to the signal input of the second switch, the second status signal;

receiving, by the signal input of the second switch, the second status signal;

outputting, by the second switch in response to receipt of the second power signal, power to the processing system via the second processing system power input of the processing system at the first power level;

transmitting, by the I/O module of the processing system to the signal input of the second switch, a third status signal, wherein the third status signal is indicative of a third state of the processing system;

receiving, by the signal input of the second switch, the third status signal; and outputting, by the second switch in response to receipt of the third status signal, power to the processing system via the second processing system power input of the processing system at the second power level.

17. The method of claim 16, wherein the I/O module of the processing system sequentially transmits the first status signal, the second status signal, and the third status signal to sequentially alter power to the first power domain and the second power domain.

18. The method of claim 15, further comprising:
determining, by a comparator, that the second power level has been achieved at the power input of the processing system; and
gating the power from the power input to the processing system based on the determination that the second power level has been achieved, the processing system.

19. The method of claim 1, wherein the first state of the processing system is one or more of a sleep state, a functional sleep state, and an active state.

20. The method of claim 15, further comprising
supplying, by a power supply to the switch, power at the first power level; and
supplying, by the power supply to the switch, power at the second power level.

* * * * *